Figure 1:
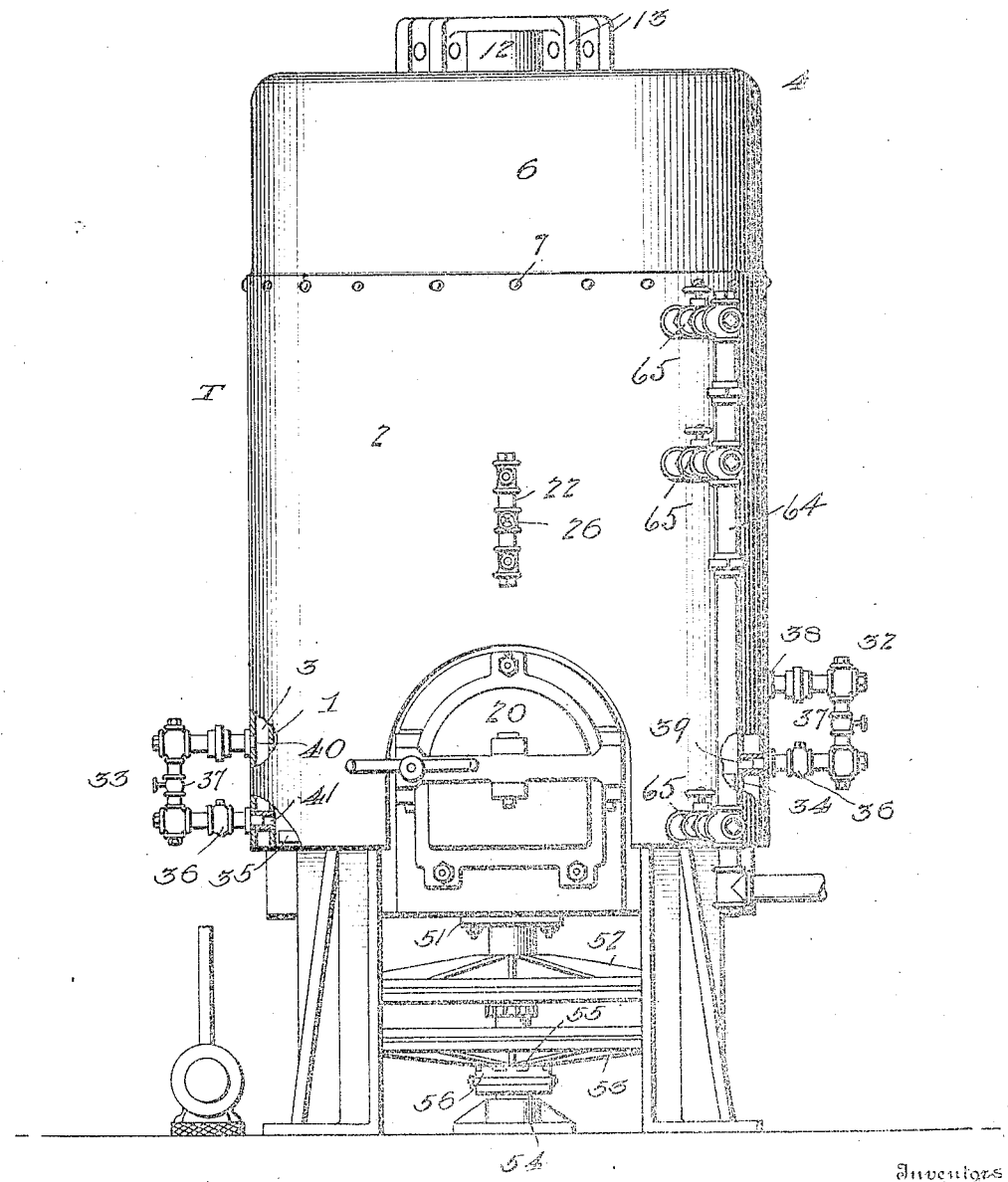

No. 896,720. PATENTED AUG. 25, 1908.
J. GOEPPINGER & H. WAGNER.
RENDERING AND DRYING PLANT.
APPLICATION FILED JAN. 19, 1907.

4 SHEETS—SHEET 2

Witnesses

Inventors
John Goeppinger &
Harry Wagner
By W. B. Barway
Attorney

Inventors
John Goeppinger
Henry Wagner
By W. C. Carman
Attorney

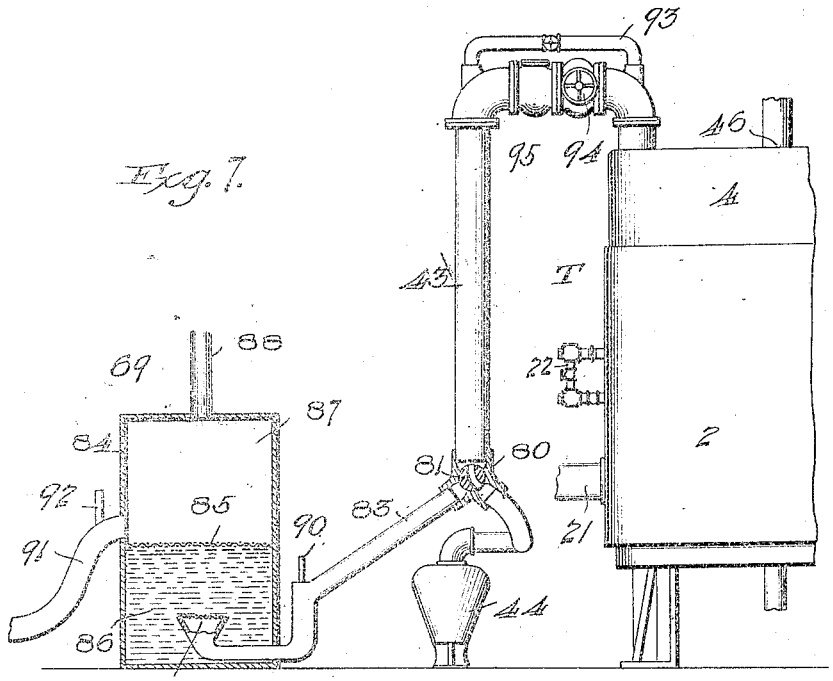
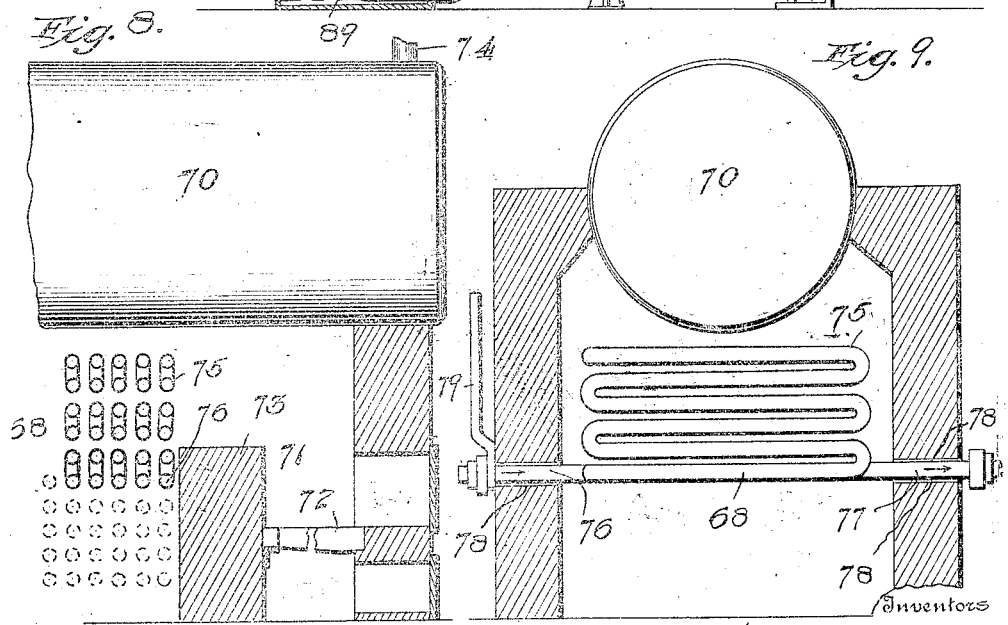

UNITED STATES PATENT OFFICE.

JOHN GOEPPINGER, OF YOUNGSTOWN, AND HENRY WAGNER, OF CINCINNATI, OHIO.

RENDERING AND DRYING PLANT.

No. 896,720.

Specification of Letters Patent.

Patented Aug. 25, 1908.

Application filed January 19, 1907. Serial No. 353,077.

*To all whom it may concern:*

Be it known that we, JOHN GOEPPINGER and HENRY WAGNER, citizens of the United States, residing, respectively, at Youngstown, county of Mahoning, and State of Ohio, and Cincinnati, county of Hamilton, State of Ohio, have invented certain new and useful Improvements in Rendering and Drying Plants, of which the following is a specification.

This invention relates to the subject of refining, rendering, steaming, drying, and condensing various products, and particularly to a plant embodying improved instrumentalities for refining, rendering, and drying, in a rapid and effective manner, tallow, greases, and fats from animal or vegetable matter, garbage, and night soil.

A general object of the invention is to provide a rendering plant embodying a single converting or reducing tank wherein the several processes of reduction and drying are performed, and which tank is operated in connection with steam or hot air, according to the particular step of the process being carried on in the tank.

Another object of the invention is to provide, in a rendering plant, a single converting tank having means for effectually introducing heat directly into, as well as about the matter contained in the tank, and furthermore, to provide an improved agitator arrangement for thoroughly agitating and disintegrating the matter to insure a most effective reduction and drying of the material.

A further object in view is to equip the plant or system with a simple and practical form of gas separator for separating and drying the gaseous products discharged from the tank during the drying operation, and also to provide an effective and practical hot air generator for supplying the tank with heat for said drying operation, said hot air generator being associated with the steam boiler equipment which supplies steam to the tank while cooking or rendering the material.

With these and other objects in view which will more readily appear as the nature of the invention is better understood, the same consists in the novel construction, combination, and arrangement of parts, hereinafter more fully described, illustrated and claimed.

Figure 2:
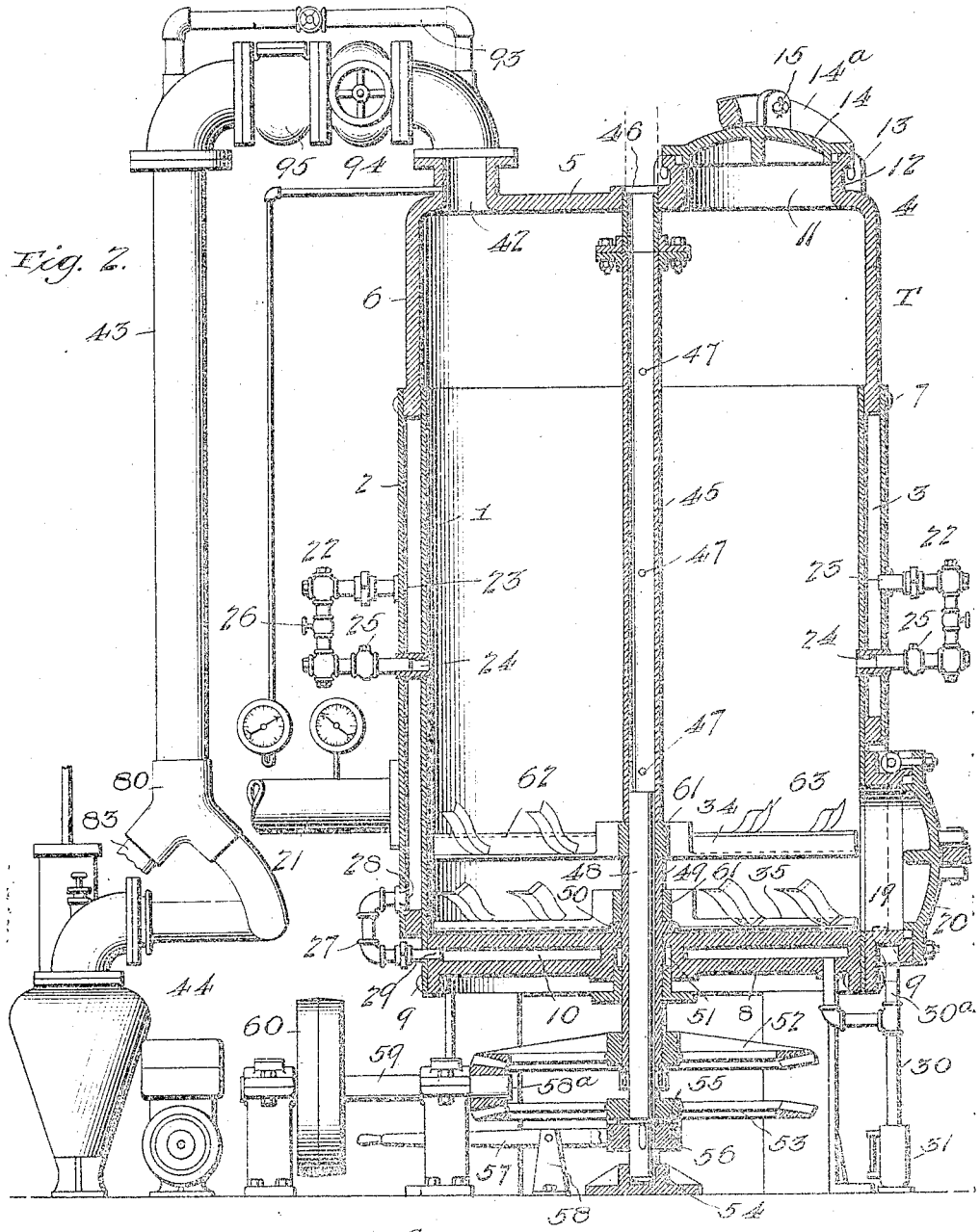
Figure 6:
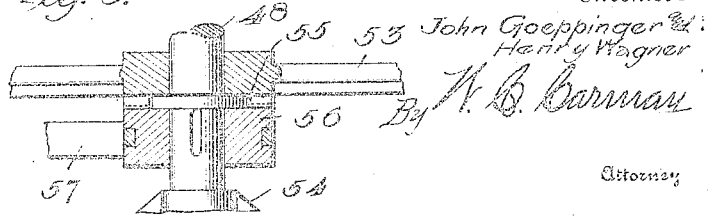
Figure 3:
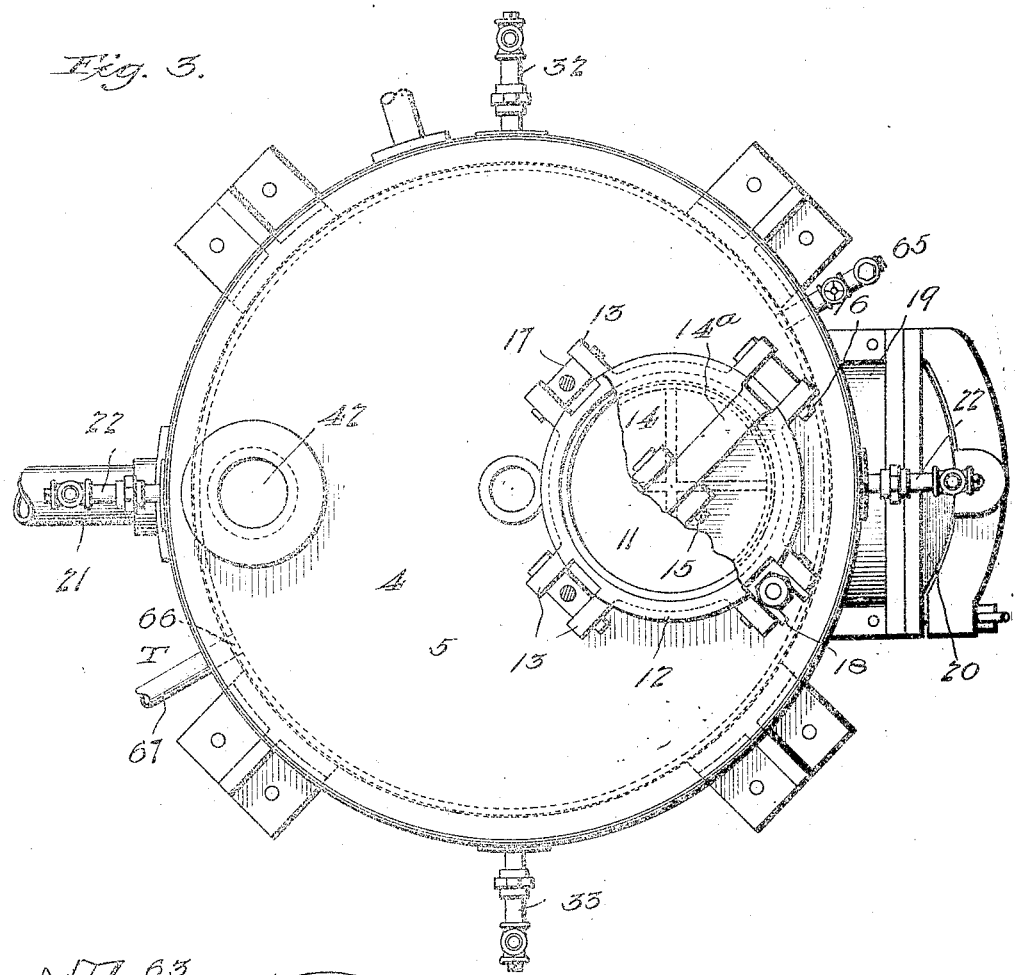
Figure 4:
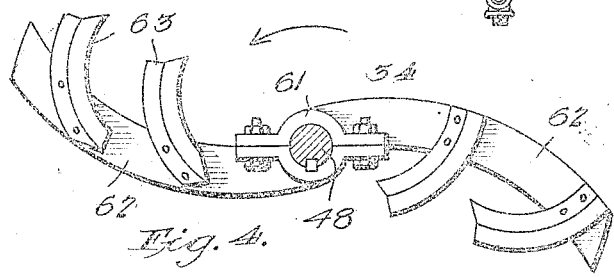
Figure 5:
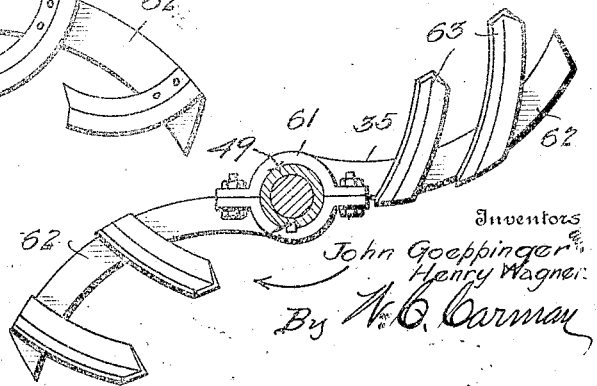

The essential features of the invention involved in carrying out the objects above indicated are necessarily susceptible to a wide range of structural modification without departing from the scope of the invention, but a preferred embodiment thereof is shown in the accompanying drawings, in which:

Figure 1 is a side elevation of a rendering apparatus embodying the present invention. Fig. 2 is a vertical longitudinal sectional view thereof. Fig. 3 is a top plan view of the same, showing the mounting of the shiftable cover for the receiving man-hole. Figs. 4 and 5 are complementary detail plan views showing the construction of the two revolving agitators and their reversed relation. Fig. 6 is a detail view of the clutch device for one of the spur gears. Fig. 7 is a sectional elevation of the plant illustrating the construction of the gas separator associated with the vapor escape pipe of the converting tank. Fig. 8 is a sectional elevation of a portion of a steam boiler furnace or steam generator equipped with the improved hot air generator forming one part of the plant or system. Fig. 9 is a transverse sectional view of a steam boiler furnace showing the hot air generator in elevation and also illustrating the pipe connection leading from this generator to the main heat supply pipe of the converting tank.

Like references designate corresponding parts in the several figures of the drawings.

The complete rendering plant or system includes as the principal instrumentality thereof a single upright tank designated in its entirety by the reference character T, and which may be properly termed a converting tank, inasmuch as all of the processes involved in reducing, converting, or breaking up the fats and other substances, and the drying thereof, are carried on therein. The tank comprises a cylindrical body having, for the greater portion of its length, a double wall consisting of the inner and outer shells 1° and 2, forming a heating jacket 3, which assists in heating the contents of the tank. The tank also includes a one-piece cast dome 4 at the top, formed with a closed crown sheet 5, and a pendent shell portion 6, the latter fitting between and secured to the top edge portions of the inner and outer shells 1 and 2, preferably by means of a line of rivets 7 located quite a distance below the crown 5, which distance is below the point at which the acids and gases accumulate. In apparatus of this character one of the difficulties experienced has been that the acids and gases destroy the rivets and thus impair the tank, whereas by locating the rivets below what may be termed the acid and gas line they necessarily last longer and thus add to the durability of the tank. Furthermore, the construction described, to-wit: a tank made up of a main jacketed portion and a top one-piece cast crown, is exceptionally strong and capable of withstanding the wear and tear imposed upon a rendering and drying plant. In addition to the parts described, the tank T has a bottom head 8 fastened as at 9 within the lower end of the jacketed part of the tank body, and of a hollow formation to provide therein a heating chamber 10 of approximately the same area as the head itself, and which, when supplied with heat, provides means for effectually heating, and maintaining the heat of, the tank at the bottom.

To provide for the introduction of material into the tank, the dome 4 is provided with a top receiving man-hole 11, surrounded by an upstanding flange 12, about which are arranged a plurality of sets of hinge lugs 13, which provide for the shiftable mounting of the swinging cover 14. The said cover is adapted to snugly fit on the man-hole flange 12 and is equipped with a carrying bar 14$^a$ having pivotal mounting intermediate its ends, as at 15, on top of the cover, and arranged to have one end hinged, by means of a detachable hinge-pin 16, between a pair of any of the sets of hinge-lugs 13. Hence, by reason of thus arranging the carrying member for the cover 14 the latter may be mounted to swing open in any of several directions as may be most convenient, according to the set-up position or location of the tank. Those hinge-lugs 13 which are not utilized for the hinge mounting of the cover have fitted thereto the ordinary type of swing or hinge bolts 17, adapted to have a releasable clamping engagement with the bifurcated clamp ears 18, projected from the edge of the cover in a spaced relation corresponding to the spacing of the sets of hinge-lugs 13.

The removal of the solids from the bottom of the tank is effected through a bottom discharging man-hole 19 formed in the jacketed wall of the tank immediately above the plane of the bottom 8 thereof. This discharging man-hole or man-hole fitting 19 is equipped with a door or cover 20 mounted and clamped in position in any approved manner.

The main heating jacket 3 is supplied with heat by means of a main heat supply pipe 21, in communication with the jacket 3, and designed to receive and carry a supply of steam or hot air. The latter, entering the jacket 3, fills the same throughout and thereby provides a heated wall for the tank, and in addition to thus applying heat externally to the solids and liquids within the tank, the steam or hot air is delivered directly into such contents from the surrounding wall of the tank through the medium of a plurality of heat circulating pipes 22. These are arranged upon the exterior of the tank and communicate respectively with the jacket 3 at 23, and with the interior of the tank at 24 as may be plainly seen from Fig. 2 of the drawing. The said pipes 22 are equipped with suitable non-return check valves 25 to prevent the outward escape of the contents from the tank, and are also fitted with suitable cut-off valves 26 which may be opened or closed at will as conditions require.

Supplementing the pipes 22, the apparatus is further equipped with a bottom heat-circulating pipe 27, which respectively connects with the jacket 3 as at 28, and with the interior of the bottom heating chamber 10 as at 29, to provide for circulating the steam or hot air into the chamber 10. The latter also acts in the capacity of a drain chamber from which drain water may be drained off through a drain pipe 30. In case of the use of steam, the steam and drain water passes through the pipe 30 to a steam trap 31 of any approved construction and performing the usual functions, and in this connection, it will be observed that the main drain pipe 30 has connected therewith a branch drain pipe 30$^a$ having communication with the heating jacket 3 at the bottom thereof, as plainly indicated by the dotted lines in Fig. 2 of the drawings. This branch drain pipe connection 30$^a$ subserves the same function with the jacket 3 as the main drain pipe 30 subserves in connection with the bottom heating chamber 10.

The system of pipe connections is completed by the employment of the heat circulating pipes 32 and 33 which serve to supply steam or hot air from the heating jacket 3 to the interior of the tank T, respectively in the plane of the upper and lower revolving agitators 34 and 35 to be presently referred to. Each of the pipes 32 and 33 is equipped with a non-return check valve 36 and with a controlling or cut-off valve 37 which may be opened and closed at will to suit the conditions of the process. The pipe 32 has a connection at one end as at 38 with the heating jacket 3 of the tank, and at its other end as at 39 with the interior chamber of the tank in the plane of the upper revolving agitator 34 so as to admit steam or hot air into the cavity, openings or spaces, caused by the movement of the said upper agitator through the contents of the tank. Likewise, the other pipe 33 has communication at its opposite ends respectively with the heating jacket 3 as at 40, and with the interior of the tank as at 41, the latter point being in the plane of rotation of the lower agitator 35 so as to admit steam or hot air into that portion of the contents of the tank which is being agitated and disintegrated by the action of the said lower agitator.

In connection with the piping system, it may be noted at this point that the vapors or gases emitted from the matter within the tank finds egress through the top gas outlet 42 formed in the crown sheet 5 of the dome 4, and in communication with the vapor escape pipe 43 having suitable connection with a condenser-pump plant 44 of any approved type. This part of the apparatus provides for effectually freeing the tank from all vapors and gaseous products and disposing of the same for commercial or other purposes, while the solids are dried out in the heated tank and finally removed through the discharging man-hole 19.

A distinctive feature of the present invention resides in the employment of an interior heat supply pipe 45. This pipe is arranged centrally and longitudinally inside of the tank and is connected at its upper end with the center of the dome as at 46 to receive at such point a suitable connection for the supply or inlet of steam, air, or water, so that heat may thus be supplied to the interior pipe 45, and by it discharged into the contents of the tank through a plurality of discharging ports or openings 47, piercing pipe 45 at different points. The arrangement of these ports 47 is such as to provide for discharging steam, air, or water into the tank at the top, intermediate, and bottom portions thereof.

In the practical carrying out of the invention, the lower end of the interior heat supply pipe 45 may be conveniently stepped on and over the upper end of a vertically arranged rotary agitator shaft 48. This shaft may be properly termed an inner shaft since it is arranged concentrically within an outer tubular agitator shaft 49. The latter essentially consists of a sleeve projecting upwardly within the bottom portion of the tank at the center of the latter, and provided with an annular supporting collar 50 resting in the bottom head 8 of the tank, while below said collar the sleeve shaft 49 is journaled in a stuffing box bearing 51 provided centrally in and on the bottom head 8. The lower end of the sleeve shaft 49 projects below the tank bottom, and carries a bevel spur wheel 52 which is arranged above, in spaced and reversed relation to, a corresponding bevel spur wheel 53 loosely mounted on the lower end portion of the inner agitator shaft 48. The lower extremity of the latter shaft below the plane of the wheel 53 is stepped in a bottom stationary step-bearing block 54. The hub of the loose spur wheel 53 is provided with a clutch face 55 whose clutching elements are adapted to interlock with the complemental corresponding clutching elements of a sliding clutch collar 56 feathered on the shaft 48 and adapted to be moved into and out of engagement with the clutch face 55 of the wheel 53 by means of a shifting lever 57, which may be conveniently mounted on a bearing bracket or equivalent support 58. The two spur wheels 52 and 53 receive their motion from a driving pinion 58ª interposed between and meshing therewith and mounted on the inner end of a suitably supported drive shaft 59, on which is also mounted the driving pulley 60 receiving the belt from the engine or other motor. Hence, the driving gear described comprises means whereby both agitators 34 and 35 may be simultaneously rotated in opposite directions, and by throwing the clutch 55—56 out of gear the upper agitator carried by the inner shaft 48 will remain idle, while the other and lowermost agitator at the extreme bottom of the tank continues to revolve.

Referring more particularly to the two agitators, it will be observed that the same are arranged in superposed relation, one above the other, within the bottom portion of the tank and subject the contents of the latter to a strong churning action in opposite direction. The upper agitator 34 is secured to the upper end portion of the inner shaft 48 and turns therewith, and the lower of said agitators 35 works close to and directly over the bottom of the tank and is secured to the inner upper end portion of the sleeve shaft 49.

Each of the agitators 34 and 35 is preferably like the other in construction, the same consisting of a central clamp hub 61 and opposite reversely curved arms or sweeps 62 extending from opposite sides of the hub and each carrying a plurality of longitudinally curved working blades 63. The blades 63 for each arm 62 project upwardly from the latter and are preferably of an angular or V-shape in cross section. Also, the blades 63 of each arm are set at a rearward inclination with reference to the direction of rotation, but the corresponding parts of the two agitators are reversely related so that each agitator in its own plane of rotation will cause a similar agitating action to the other agitator.

In using the apparatus, it will be understood that after introducing the animal matter or other material to be treated, the tank is entirely closed and the heat-supply turned on to provide for heating, and maintaining the heat of the wall and bottom of the tank, as well as to provide for discharging steam or hot air directly into the material throughout the tank, and into such material as is being worked in the plane of the agitators 34 and 35. The contents of the tank are thus thoroughly heated, steamed or cooked a sufficient length of time to render out the fat, the greater portion of which rises to the surface of the mass, while the vapors and noxious gases generated during the cooking steaming or drying stage are carried off through the vapor discharge pipe 43. The effect of the two agitators is to break up bones and other substances, as well as to disintegrate any fat-containing solids so that a maximum per cent. of the fat is separated from the mass, and may be drawn off through the draw-off pipe 64 having a plurality of valved tapping connections 65 with the interior of the tank at a plurality of elevations. After drawing off the fat, the continued application of heat to the tank serves to dry out the residuum, so it will be seen that the apparatus comprises means whereby within a single tank may be carried on the several operations necessary for refining, rendering and drying animal or other matter containing fats and greases.

In connection with the provision of the draw-off connections or cocks 65, the upper part of the separating tank is preferably provided with a jet opening 66 located diametrically opposite the upper draw off cock 65, and having fitted thereto a blow pipe 67 in communication with a suitable source of water supply so that steam or water can be introduced into the tank for the purpose of blowing off, through the said valve or cock 65, the scum and other accumulations which may gather or float on the top of the water in the tank, said steam or jet creating a current in the direction of the draw-off valve which carries the refuse up to and through such valve into the draw off or drain pipe 64.

A general explanation has been made of the use of the single converting tank, and the action of the agitators therein, but for the specific operations of cooking or rendering, and for drying, different instrumentalities are brought into play in combination with the converting tank. These instrumentalities form an integral part of the complete rendering tank or system and may be referred to respectively as a hot air generator 68 and a gas separator 69. The hot air generator 68 preferably forms a part of the steam generator plant operated in connection with the rendering apparatus for supplying steam thereto. This steam generator plant preferably consists of an ordinary type of steam boiler furnace including in its organization a boiler 70 and a furnace fire box 71 equipped with the usual grate surface 72, and the rear wall of which fire box is formed by the bridge wall 73 over which the fire, smoke, and other products of combustion pass beneath the boiler toward the back end of the furnace. The boiler 70 has fitted thereto a steam supply pipe 74 having suitable valved branch connections with the heat supply pipe 21 for the jacket 3, and with the inlet 46 for the interior pipe 45, so that during the cooking or rendering operation, the steam can be delivered directly from the steam generator to the parts of the converting tank receiving the same.

As already indicated, the hot air generator 68 preferably forms an auxiliary of the steam boiler furnace and consists of a vertically swinging bank of continuous pipe coils 75 adapted to be arranged within the furnace casing in rear of the bridge wall 73, or within dome or stack, and adapted to be thrown up into the line of the heat and fire passing over the bridge wall 73, or to a plane below the top of, and masked by, such bridge wall. The bank of coils 75 are of the continuous return-bend type, or any other suitable construction, and are carried upon and by the axially alined and diametrically opposite pipe terminals 76 and 77. These pipe terminals constitute respectively the inlet and outlet for the bank of coils and act as trunnions journaled in bearings 78 formed in the sides of the furnace casing dome or stack. The inlet pipe terminal 76 is supplied with cold air from a pump or other source of supply, while the outlet pipe terminal 77 has suitable valved branch connections respectively with the heat supply pipe 21 and with the inlet 46 for the pipe 45 of the converting tank. An operating lever 79 connected with one of the trunnions for the hot air generator 68 provides means for swinging the same to either of the positions shown in Fig. 8 of the drawings.

As a part of the plant or system, the gas separator 69 is utilized in connection with the vapor discharge pipe 43, which pipe is common to a Y fitting 80 equipped with a two-way valve 81 providing means for directing the gases into either the pump 44 connected with one branch of the Y fitting, or into the separator pipe 83 employed to carry the gases into the separator 69. The latter essentially comprises a separating tank 84 having intermediate the top and bottom thereof a perforate diaphragm 85 below which is formed the water chamber 86 and above which is formed the gas chamber 87 with which latter chamber is connected the gas service pipe 88 which conducts the freed gas to the furnace where the same may be utilized as fuel. The separating tank 84 has arranged within the bottom of its water-filled chamber 86 a screened delivery funnel 89 connected with the inner end of the pipe 83 entering the bottom of the separating tank. The said pipe 83 has fitted thereto, exterior to the separating tank, a supplemental water supply pipe 90 through which water is admitted for condensation purposes, while the drainage pipe 91 for the separating tank has fitted thereto a disinfectant supply pipe 92 which permits a suitable disinfectant to be dropped into the overflow or drainage as it passes through the pipe 91 so that foul and noxious odors can be destroyed before turning the waste into the sewer. The pipe 91 connects with the separating tank 84 immediately above the plane of the perforate diaphragm 85.

As an additional element brought into play under certain conditions, there is employed a valved by-pass gas pipe 93 whose opposite ends are connected with the vapor escape pipe 43 respectively at opposite sides of the cut-off and check valves 94 and 95 for said pipe 43. In other words, the by-pass 93 bridges the valves 94 and 95 and is intended to be used in the rendering or cooking process, whereas, when the apparatus is used for drying, the by-pass 93 will be closed and communication opened direct through the valves in the main pipe 43, as there will then be greater pressure in the tank. The by-pass 93 is required to provide a similar escape port while rendering.

The pump 44 is cut in by the valve 81 while cooking or rendering, but when using the hot air only for drying, the pump is cut out by the valve 81, as the drying can be accomplished much more economically and readily in this way than by the use of the common pump.

In the drying process the hot air is introduced into the converting tank in the same manner as for rendering or reducing, that is, by the same pipes 21 and 45, as previously explained, and then, escaping with the gases through the pipe 43, enters the gas separator 69 which serves to draw off the water and condensation as it passes through the diaphragm 85, while at the same time permitting the freed gas to pass out to the point of use through the pipe 88.

In the use of the plant, another feature of advantage for the center pipe 45 is that the injection of water or air through the openings of this pipe into the center of the tank and above the solid matter causes a constant agitation or disturbance in the water, which results in driving the scum, et cetera, produced in rendering vegetable matter, to the surface of the water from where it can be drained off promptly.

We claim:

1. In an apparatus of the class described, the combination of a converting tank having a surrounding heating jacket and interior heat supplying means, and agitating means located wholly within the bottom portion of the tank and leaving a main unobstructed working chamber thereabove.

2. In an apparatus of the class described, a converting tank, a plurality of agitators within the tank, and means for delivering hot blasts into the tank from the wall thereof within the planes of the agitators and also above the same.

3. In an apparatus of the class described, a tank, a centrally arranged heat supply pipe fitted within the tank and having discharging ports, inner and outer agitator shafts arranged at one end of the tank and the innermost of which shafts receives and supports one end of the heat supply pipe, a revolving agitator fitted to each of said shafts, and driving gear for the latter.

4. In an apparatus of the class described, a tank, a pair of superposed revolving agitators mounted solely within the bottom portion of the tank to operate beneath the mass of material and driving gear for said agitators comprising means for simultaneously rotating both agitators, or only one of the same.

In testimony whereof we hereunto affix our signatures in the presence of two witnesses.

JOHN GOEPPINGER.
HENRY WAGNER.

Witnesses:
JOSEPH F. WILLIAMS,
CHAS. M. RAMSEY.